United States Patent [19]

Cousin et al.

[11] 4,145,452

[45] Mar. 20, 1979

[54] FATTY SUBSTANCES OF QUASI-VITREOUS STRUCTURE

[76] Inventors: Charles M. Cousin, 215 Avenue Victor-Hugo, 62400 Bethune; Patrick G. Cavroy, 29 Avenue Rapp, 75007 Paris, both of France

[21] Appl. No.: 843,551

[22] Filed: Oct. 19, 1977

Related U.S. Application Data

[63] Continuation-in-part of Ser. No. 757,335, Jan. 6, 1977, abandoned, which is a continuation of Ser. No. 538,941, Jan. 6, 1975, abandoned.

[30] Foreign Application Priority Data

Jan. 14, 1974 [FR]  France .................................. 74 01154

[51] Int. Cl.² .............................................. A23D 5/00
[52] U.S. Cl. .................................... 426/321; 426/601; 426/610; 426/613; 426/660
[58] Field of Search ............ 426/601, 610, 321, 330.6, 426/613, 660

[56] References Cited

U.S. PATENT DOCUMENTS

| | | | |
|---|---|---|---|
| 1,444,562 | 2/1923 | Sherman | 426/189 |
| 1,903,126 | 3/1933 | Newton et al. | 426/542 |
| 2,168,360 | 8/1939 | Musher | 426/201 X |
| 2,279,202 | 4/1942 | Musher | 426/99 |
| 3,023,104 | 2/1962 | Battista | 426/201 X |
| 3,271,166 | 9/1966 | VanLeeuwen | 426/189 |

*Primary Examiner*—Joseph M. Golian
*Attorney, Agent, or Firm*—Diller, Ramik & Wight

[57] ABSTRACT

A quasi-vitreous structure is obtained for a fatty substance by the addition of dry vegetable gum which is soluble in water but insoluble in the fatty substance. The fatty substance consists of fatty constituents which are crystallizable at ambient temperature and oils, and the dry vegetable gum is dispersed therein by prolonged kneading to modify the structure of the fatty substance so that it is of quasi-vitreous structure. The substance is particularly useful as a food product.

22 Claims, 15 Drawing Figures

FATTY SUBSTANCES OF QUASI-VITREOUS STRUCTURE

CROSS REFERENCES TO RELATED APPLICATIONS

This application is a continuation-in-part of copending application Ser. No. 757,335, filed Jan. 6, 1977, now abandoned and which was a continuation of application Ser. No. 538,941, filed Jan. 6, 1975 and now abandoned.

BACKGROUND OF THE INVENTION

Fatty substances are essentially mixtures of glyceridic esters of so-called fatty organic acids. Certain of these esters are, when isolated, solid at ambient temperature, the others being liquid. Depending on the proportions of the different esters, these mixtures can be free-flowing, in which case they are known as oils, or pasty or solid, constituting fats. The fatty substances are composed of an aggregate of crystals of the solid esters which is impregnated with the liquid esters or oils.

Particularly in the food industry, it is normal practice to prepare solid objects, which are required to have a determined shape, such as bars, patties, thin layers, or coatings and fillings, by moulding a grease-based composition. The desirable qualities for these compositions are good plasticity during moulding, a predetermined contraction on solidifying, and good subsequent preservation of the composition. The different constituents of the composition are selected on the basis of chemical, biological, and organoleptic criteria which have little connection with the above mentioned physical criteria. Thus, the fats used in the foodstuff industry are in the form of aggregates of fairly large crystals impregnated with oil, which on solidification give rise to contraction which varies with the composition of the fat. The temperature range or working range within which these compositions remain capable of flowing while retaining a certain mechanical stability generally varies in inverse proportion to the contraction. Since the crystal matrix has fairly large pores, the residual oily phase is relatively unstable and tends to exude through the separation of the solid and liquid phases. This separation is particularly troublesome in the case of food-stuff compositions, in which the sapid elements are mainly contained in the oily phase, so that separation leads to a loss of the organoleptic properties of the composition. Similarly, when the foodstuff composition is consumed, separation is accelerated and the organoleptic properties vary in the course of consumption, which may give rise to unpleasant "after-tastes".

SUMMARY

The applicants have now discovered that through intimate dispersion of a vegetable gum in the dry state in predetermined proportions in fatty substances which are solid at ambient temperature and which may or may not contain dry fillers, it is possible to obtain these fatty substances in a quasi-vitreous state or a state in which these fatty substances no longer have the character of a crystallized solid at determined solidification temperatures, but behave like glasses whose viscosities increase continuously when the temperature is lowered, until solidification occurs. This quasi-vitreous structural state is likewise manifested by a widening of the working range or temperature range within which the substance is sufficiently plastic to be shaped. In this quasi-vitreous state, contraction on crystallization no longer occurs and the reduction of volume accompanying cooling becomes progressive, so that it is possible to control contraction in the course of the solidification. In this state, moreover, the tendency of the oils to separate from the mixture is considerably reduced.

This technique of dispersion of a gum appears to depart fundamentally from previous techniques of utilizing gums, particularly because of the feature comprising their incorporation in the dry state in the fatty substance to be treated, since in this case the presence of water can be considered to be detrimental. If the products contain a certain amount of water, a corresponding amount of gum will be associated with this water, and the unassociated gum will then be the dry gum in the sense of the present description.

The invention accordingly provides a fatty substance containing fatty constituents which are crystallizable at ambient temperature and also oils, characterized by a quasi-vitreous structure which is determined by filling with dry gum in a mechanically dispersed state.

The above mentioned filling is advantageously composed of a dry gum in an amount between 0.01 and 1.5% by weight of the fatty substance, the latter being held divided into small zones bounded by elongated chains of the said gum.

The gum is selected from vegetable gums comprising the guaranates, the carraghenates, alginates, carob gum, the pectins, gum arabic, gum tragacanth, and resin and is added to the said fatty substance in the pulverulent, dry state.

Furthermore, the dry gum preferably constitutes between 0.02 and 0.8% by weight of the fatty substance.

As a variant, a fatty substance of quasi-vitreous structure is obtained by mixing two starting batches, one of the two batches being a fatty substance of the kind described above.

As a variant, the fatty substance also contains a dry filler substance.

In a process for the preparation of a fatty substance of the kind described above, the said fatty substance is heated beyond its melting point, the aforesaid dry gum is added, the gum is dispersed mechanically in the fatty substance, and the resulting dispersion is allowed to cool, with kneading until the consistency is firm.

In one form of the above process the said dry gum is dispersed by extended kneading with cooling to a firm consistency.

As a variant of the process, at least part of the said gum is introduced into the fatty substance when it has a firm consistency.

As an intermediate product in the preparation of fatty substances of quasi-vitreous structure, the fatty substance contains a filler of dry gum.

BRIEF DESCRIPTION OF THE DRAWING FIGURES

Laboratory tests with a view to determining the optimum proportions of gum were carried out in the following manner.

The retardation of crystallization is determined by microscopic examination of the fat undergoing cooling between a glass slide and a cover glass. The time taken for the appearance of an opaque crystalline structure on the fat being tested and an untreated control fat of the same nature are compared. The delay in crystallization is defined as the ratio of the difference of the times of crystallization of the treated fat and control fat to the crystallization time of this control.

Contraction is measured by pouring 20 ml of melted fat into a 50 ml graduated flask; the contents of the flask are made up to the line with water at a temperature slightly higher than the crystallization point of the fat; the flask is placed in a chamber at 13° C; after solidification of the fat the contents are made up to the line with cold water; the ratio between the volume of water added to the volume of melted fat defines contraction.

In order to appreciate the effect of the agitation or kneading on the properties of the fats after treatment, the amount of agitation is arbitrarily defined by the supply voltage of the motor of the agitator used.

Operating with a hydrogenated palm oil having a melting point of 45° C., the following results were obtained:

Table I shows the delay of crystallization and the contraction in dependence on the percentage of dispersed gum, dispersion being effected by the agitation defined by the half-voltage and at a temperature of 35° C.

TABLE I

| Proportion of gum (%) | 0 | 0.05 | 0.2 | 0.4 | 0.7 |
|---|---|---|---|---|---|
| Delay in crystallization | 0 | 20 | 60 | 40 | 40 |
| Contraction(%) | 14 | 2 | 0.5 | not measurable | |

Curves 1 and 4 express graphically the results shown in Table I. It can be seen that the delay passes through a maximum at about 0.2% of gum, while contraction is practically eliminated for contents close thereto.

Curves 2 and 5 were plotted for a gum content of 0.4% and a temperature of 35° C. When the speed of the agitator is increased by applying an increasing voltage to the motor of the agitator, an increase in the delay is found with an increase of agitation, with a horizontal asymptote, while contraction becomes very slight starting from moderate agitation.

Figure 1:
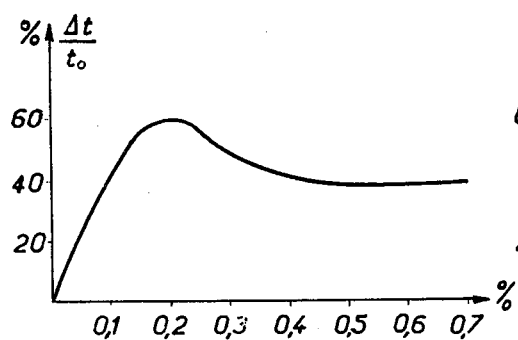
FIG. 1 is a curve of crystallization delay plotted against gum content.
Figure 2:
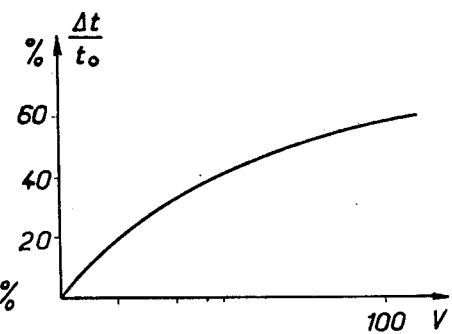
FIG. 2 is a curve of crystallization delay plotted against speed of agitation.
Figure 3:
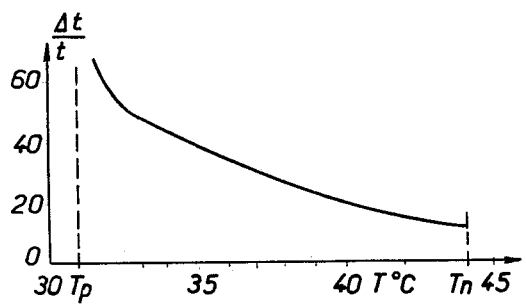
FIG. 3 is a curve of crystallization delay plotted against final agitation temperature.
Figure 4:
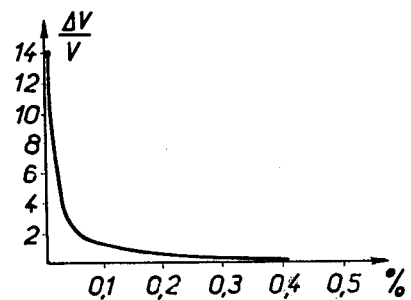
FIG. 4 is a curve of contraction plotted against gum content.
Figure 5:
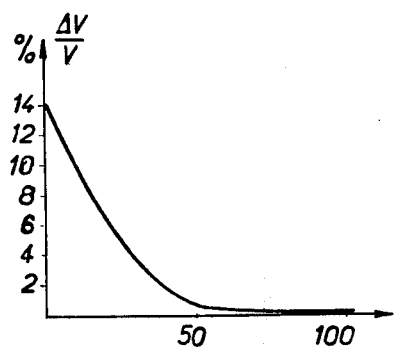
FIG. 5 is a curve of contraction plotted against speed of agitation.
Figure 6:
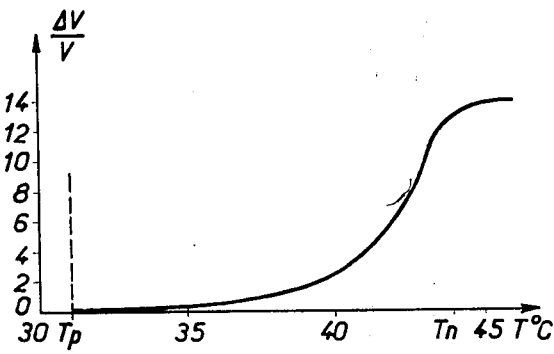
FIG. 6 is a curve of contraction plotted against agitation temperature.

When the agitation temperature T is varied between the nucleation temperature $T_n$, at which crystallization germs appear, and the setting temperature $T_p$ of the fat, at which the agitator is jammed, working with a gum content of 0.4% and half-voltage applied to the motor of the mechanical agitator, the results shown in FIGS. 3 and 6 are obtained. It is found that the delay decreases progressively when the agitation temperature is increased, while contraction increases abruptly as the nucleation temperature is approached.

Mixture separation tests were made by measuring the amount of oil exuded. A predetermined amount of fat (hydrogenated palm oil having a melting point of 45° C.) was kept in a stove at 36° C., that is to say 9° C. below the melting point. The oil exuded on the surface was collected by absorption by a previously weighed piece of filter paper. The amount of oil adsorbed was determined by weighing. Whereas the control showed 2% of exuded oil, the mass of the filter paper associated with the treated fats being tested showed no significant variation starting from gum contents of 0.05%.

Similar tests were carried out with different fats: hydrogenated palm oil having a melting point of 39° C., hydrogenated cabbage palm oil having a melting point of 39° C., cacao butter and cacao butter with the addition of 15% of groundnut oil. The results of these tests were similar. The crystallization delays show maxima for a determined gum content which is characteristic of the fat used, the contractions clearly decrease with increasing contents of gum, and the exudation of the oily components is practically eliminated by the addition of gum. It is also found that the new properties revealed by the tests are the better, the more vigorous the agitation and the longer it is prolonged during the cooling towards the setting temperature. It is obvious that the agitation energy is limited by the introduction of a substantial amount of air into the agitated mass.

The gums are soluble in water but insoluble in the fatty constituents and are generally derivatives of higher polyholosides, and the numerous hydrophilic groupings of their molecules assist the formation of cross-linked structures or elongated chain structures. By higher polyholosides is meant that subclass of glycosides which yields at least five glucoses on hydrolysis. Vigorous kneading between the nucleation point of the fatty substance and the setting zone leads to the formation of elongated gum chains which are dispersed in the fatty substance, dividing the latter into small zones enclosing the crystallization nuclei. The enlargement of the nuclei and their aggregation are thus halted, and the structure is then close to that of glasses, with a dispersion of crystallides in an amorphous matrix. This structure solidifies into a metastable state on setting.

Figure 7:
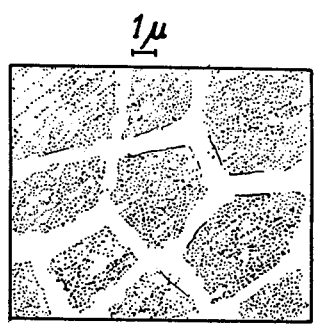
FIG. 7 shows the appearance of a solidified hydrogenated palm oil, seen under the microscope.
Figure 8:
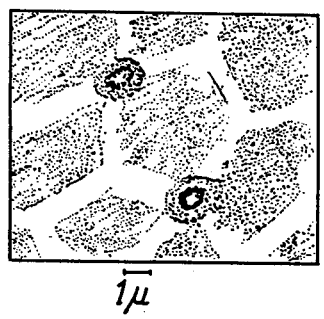
FIG. 8 shows the appearance under the microscope of a hydrogenated palm oil to which a gum has been added.
Figure 9:
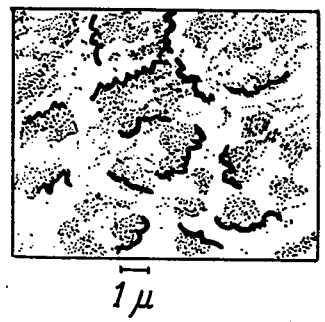
FIG. 9 shows the appearance under the microscope of a hydrogenated palm oil with the addition of gum, after dispersion of the latter.

The microphotographs shown in FIGS. 7, 8 and 9 suggest the formation of a structure of this kind. FIG. 7 is a microphotograph of a crystallized fat to which no gum has been added. The crystals can be clearly distinguished and the oily component appears between the crystals. If the gum is added without its dispersion being pursued, as shown in FIG. 8, the gum appears collected in spherules which take up position between certain crystal points. On the other hand, when agitation is pursued until setting occurs, as shown in FIG. 9, there are no longer any clearly defined crystalline forms, but areas of irregular frontiers formed by the oil blocked by elongated chains of gum, these areas containing a mixture of oil and of crystallites of fat. As is evident from FIGS. 8 and 9, the gum is insoluble in the fatty constituents.

It is also possible that the adsorption of the crystallization nucleus of the fats by means of the free lipophilic groups of the dry gums hinders the enlargement of these nuclei and therefore the normal process of crystallization. This mechanism is suggested by the results of tests of dispersion in fatty substances of dry pulverulent substances having high adsorptive power, particularly kieselguhr or diatomaceous earth. It has in fact been found that by dispersing 0.1% by weight of kieselguhr in a fatty substance, with energetic kneading to cooling, this fatty substance is obtained in a quasivitreous state very similar to that obtained with the dry gums, without a clear solidification point. Nevertheless, stability over a period of time or at a temperature close to the soltening point was found to be very inferior to that of fatty substances containing dry gums.

The performance of the process according to the invention will be better understood on reading the following examples:

EXAMPLE 1

2 tons of hydrogenated palm oil having a melting point of from 38° to 40° C. are placed in Petzholdt conching vessel. The mass is heated to 75° C. 6 kg of guaranate and 0.400 kg of carraghenate suspended in about 30 kg of hydrogenated palm oil are then added. Kneading is started and the temperature is lowered to 27° C. Kneading is continued at full power for half an hour at this temperature, and then the treated fat is poured into plastics containers, which are then packed in cartons.

EXAMPLE 2

100 kg of 42°/44° C. hydrogenated palm oil and 50 kg of 38°/40° C. hydrogenated palm oil are placed in a conching vessel. The mass is heated to 75° C. and 150 g of guaranate and 30 g of carraghenate suspended in about 1 kg of hydrogenated palm oil are added. Kneading is started, temperature is lowered to 34° C., kneading is continued at full power for half an hour, and the treated fat is poured into plastics containers which are then packed in cartons.

EXAMPLE 3

22.2 kg of fat treated the day before as in Example 2 are placed in a roller mixer, 46 kg of sugar, 22.5 kg of skimmed milk, 3.2 kg of cacao powder containing from 10 to 12% of cacao butter, and 35 g of lecithin are added. These ingredients are mixed and are tempered in the conventional manner for making chocolate. After tempering the mixture is ground in a cylinder grinder and then placed in a conching vessel with an addition of 3.8 kg of fat treated as in Example 2 and 265 g of lecithin, and is worked for 6 hours. The mixture is cooled to about 40° C. to form a relatively thick paste and is then poured into bars.

EXAMPLE 4

Chocolate tempering is effected in a roller mixer with 22.2 kg of untreated fat, 46 kg of sugar, 22.5 kg of skimmed milk, 3.2 kg of cacao powder containing from 10 to 12% of cacao butter, and 35 g of lecithin. The paste is ground in a cylinder grinder and the entire ground paste is transferred to conching vessel. 3.8 kg of untreated fat, 26 g of guaranate, and 6 g of carraghenate are added. If any moisture is present, the amount of gum is increased. The mixture is worked for 6 hours and poured into bars as in Example 3.

EXAMPLE 5

A tempered chocolate mixture of normal composition is prepared, with the exception that 5% of the cacao butter is replaced by an equivalent amount of fat treated as in Example 1; treatment is conventional. After storage for 18 months at ambient temperature the chocolate obtained shows no signs of saponification.

EXAMPLE 6

A chocolate filling product for cookie making is prepared with the following composition: 6.25 kg of fat treated as in Example 1, 17.75 kg of untreated hydrogenated palm oil, 48 kg of sugar, 13 kg of cacao powder containing from 10 to 12% of butter, 15 kg of skimmed milk. The tempering treatment is effected as in Example 3. The product may be poured into thin layers or into shapes for use by cookie makers, or may be poured directly onto cookies.

EXAMPLE 7

A chocolate mixture is produced as in Example 3, with the following composition: 6.25 kg of fat treated as in Example 1, 17.75 kg of hydrogenated cabbage palm oil, 48 kg of sugar, 3 kg of cacao powder containing from 10 to 12% of cocoa butter, 25 kg of skimmed milk. The product is formed into shapes by extrusion or by injection into a mould in conventional presses designed for shaping plastics materials, after vigorous kneading of the mass cooled to about 28°–30° C. in a kneader.

EXAMPLE 8

A "Vegecao" compound was produced having the following composition: 6.25 kg of fat treated as in Example 1, 17.75 kg of hydrogenated cabbage palm oil (otherwise known as palm kernel oil), 46 kg of sugar, and 3 kg of cacao powder containing from 9–11% cocoa butter, 25 kg of skimmed milk and 0.50 kg of lecithin. "Vegecao" is a trademark owned by the chambre Syndicale de la Chocolaterie, and is used to designate a chocolate compound or substitute in which the cocoa butter component is replaced at least in part by other edible fatty substances, and contains, inter alia, sugar, vegetable fat and low butter cocoa. The mixture was treated as in Example 3 and formed into shapes by extrusion or molding.

EXAMPLE 9

200 kg of cocoa butter were placed in a double-walled stainless steel vessel and heated to 70° C. Then, 120 g of pulverulent guaranate and 80 g of pulverulent carraghenate were added to the melted cocoa butter, and the mass was stirred with a Rayneri mixer provided with a deflocculator blade, at 1500 rpm. for ten minutes.

The mix was then cooled to 12° C., the stirring was continued during cooling. When a noticeable crystallization of cocoa butter occurred on the inner wall of the vessel, the mass was reheated before further cooling. The cycle was repeated until no noticeable crystallization appeared (usually, four cycles were needed). Then the mix was poured into containers.

EXAMPLE 10

A chocolate was made in the conventional manner and comprised 36 kg of cocoa butter treated as in Example 9, 26 kg of ground cacao nibs, 50 kg of full-fat dried milk, 87.4 kg of sugar and 600 g of lecithin. The resulting chocolate was introduced into a Guittard extruder and extruded at 22° C. It should be noted that the normal solids content of cocoa butter is about 99% at 22° C.

A chocolate sample of the same composition in which cocoa butter was untreated, was extrudable only in very small quantities, the extruder fast getting blocked.

EXAMPLE 11

The preparation of a chocolate compound coating for ice-cream.

65 kg of hydrogenated palm oil, 134 kg of soybean oil and 2 kg of glycerol monostearate were heated in a double-walled stainless stell vessel, 40 g of pulverulent guaranate and 30 g of pulverulent carraghenate were added, and the mix was stirred with a Rayneri mixer, having a deflocculator blade, and operating at 1500 rpm for ten minutes. The stirred mix was cooled (to about 8°–10° C.) until the mass had a firm consistency. The cooled mass was then kneaded at the same temperature for ten minutes.

112 kg of thus treated fat, 22 kg of cacao powder (10–12% cocoa butter), 62 kg of sugar containing small amounts of cacao, 1 kg of lecithin are mixed together. The composition thus formed, having a melting point below ambient temperature, was used to coat ice cream on which it solidified.

EXAMPLE 12

200 kg of butter oil (i.e. dehydrated butter, M.P. about 35° C.) were poured into a double-walled stainless steel vessel and heated to 70° C., and 150 g of pulverulent guaranate and 120 g of pulverulent carraghenate were added. The mix was stirred with a Rayneri mixer having a deflocculator blade and operating at 1500 rpm for ten minutes. The stirred mix was cooled to ambient temperature and stirred for another ten minutes. The butter oil thus treated was then packed in cartons for subsequent testing.

The treated butter oil was compared to untreated butter oil from the same batch.

EXAMPLE 13

Solids content determined as a function of nuclear magnetic resonance (NMR) versus temperature.

Samples of both treated and untreated butter oil were tested by NMR for determining their solids (crystals) content. Results are listed in the table below.

TABLE

| Temperature (° C.) | 10° | 15° | 20° | 25° | 30° | 35° | 40° |
|---|---|---|---|---|---|---|---|
| Treated butter oil (% by weight) | 33.4 | 24.8 | 12.8 | 5.0 | 3.4 | 0.3 | — |
| Untreated butter oil (% by weight) | 29.5 | 25.5 | 15.3 | 4.2 | 1.4 | — | — |

Taking into account the statistic deviation of the measurements, no significant difference in the solids content was noted. It is to be recalled that NMR determines the total mass of the crystallized matter, irrespective of the size of the crystals in the mass.

EXAMPLE 14

Consistency tests.

(A) Needle penetration versus temperature, using a penetrometer according to A.S.T.M D5.

Penetration depth (in tenths of a millimeter)

| Temperature (° C.) | 10° | 15° | 20° | 25° | 30° |
|---|---|---|---|---|---|
| Treated butter oil | 14 | 35 | 104 | 194 | 375 |
| Untreated butter oil | 25 | 75 | 255* | — | — |

*The needle penetrated a first depth indicated, but kept on sinking.

(B) Weighted cone penetration test. The test was conducted on the same apparatus as above, the needle being replaced by a cone having an apex angle of 60°, and a weight of 250 g.

| Penetration depth (.01 mm) Temperature (° C.) | 10° | 15° | 20° | 25° |
|---|---|---|---|---|
| Treated butter oil | 47 | 72 | 150 | 264 |
| Untreated butter oil | 55.5 | 101 | — | — |

(C) Resistance to extrusion.

The fat was introduced into a laboratory extrusion tester provided with a calibrated die. The results were expressed in terms of minimum pressure (kilograms per square centimeter) required to expel the fat through the die in form of a continuous, cylindrical, consistent extruded mass the diameter of which closely corresponds to that of the die. That pressure corresponds to that which overcomes shear resistance.

| Resistance to extrusion (kg/cm$^2$) Temperature (° C.) | 10° | 15° | 20° | 25° |
|---|---|---|---|---|
| Treated butter oil | 2.10 | .75 | .35 | .05 |
| Untreated butter oil | .95 | * | * | — |

*During extrusion, first a liquid phase was expelled, and subsequently a concrete phase was extruded.

Figure 10:
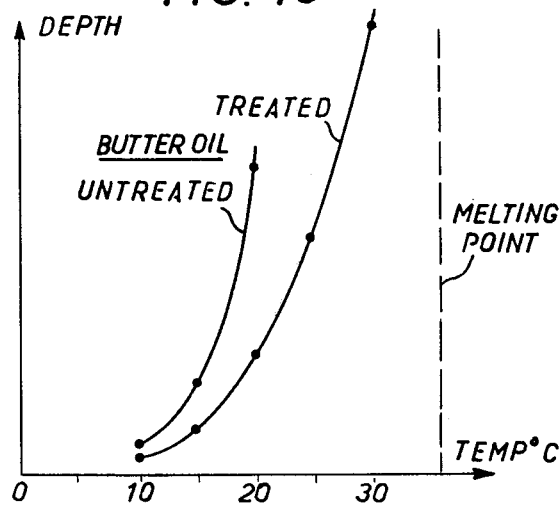
FIGS. 10, 11 and 12 are graphs showing consistency test results comparing treated and untreated compositions.
Figure 10A:
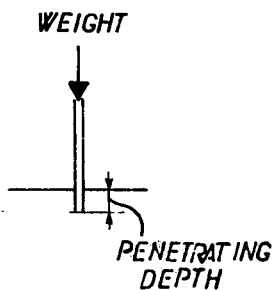
FIGS. 10A, 11A and 12A schematically show test setups for determining the consistency of compositions as plotted in FIGS. 10, 11 and 12.
Figure 11:
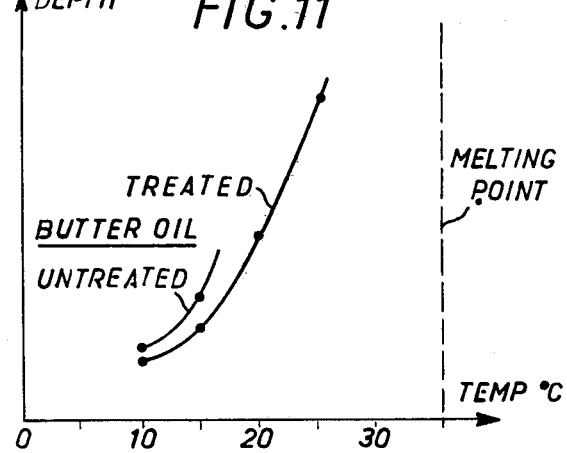
Figure 11A:
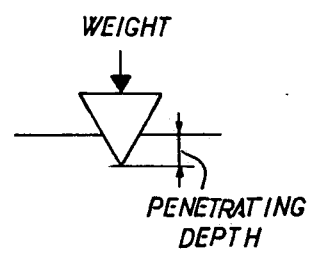
Figure 12:
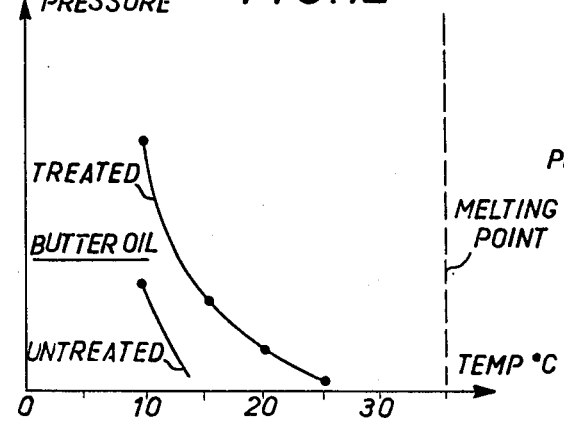
Figure 12A:

The curves corresponding to the above test results are respectively shown on FIGS. 10–12.

According to these results, the treated fat showed an extended working range and a greater cohesiveness than that of an untreated fat. From curves 10 and 11, it appears clearly that viscosities of treated and untreated butter oil are very close at low temperature (say 10° C.); when temperature increases, the viscosity of untreated butter oil decreases more rapidly than that of treated butter oil. Curve 12 shows that treated butter oil can be extruded within a temperature range (i.e. working range) from about 10° up to about 25° C., while untreated butter oil can only be extruded within a narrow temperature range near 10° C.

Similar test were conducted on numerous fats, as listed below:
Palm oil (hydrogenated and unhydrogenated)
Coconut oil (hydrogenated and unhydrogenated)
Rapeseed oil (hydrogenated and unhydrogenated)
Soya bean oil (hydrogenated and unhydrogenated)
Groundnut oil (hydrogenated and unhydrogenated)
Cocoa butter
Sunflower oil (hydrogenated and unhydrogenated)
Butter oil (fractionated or unfractionated)
Cabbage palm oil (palm kernel oil) — (hydrogenated and unhydrogenated)
Walnut oil, hazelnut oil and almond oil
Tallow
Lard
Whale oil
Monoglycerides and diglycerides The above fatty substances were used alone or in various mixtures. Oils having melting points below ambient temperature were generally admixed with other fats having higher melting points.

What is claimed is:

1. A fatty substances containing fatty constituents which are glyceridic esters of fatty organic acids, some of said fatty constituents being solid at room temperature and some being liquid at room temperature and being present in relative amounts such that the fatty substance normally has an essentially crystalline structure at room temperature, and higher polyholosides vegetable gum in amount providing between 0.01 and 1.5% by weight of said gum which is unassociated with water in said fatty substance, said gum being insoluble in said fatty constituents, said fatty substance having a quasi-vitreous structure at room temperature in which the fatty constituents are divided into small areas bounded by elongated chains of said gum.

2. A fatty substance according to claim 1, wherein said gum is selected from the group consisting of guaranates, carraghenates, alginates, carob gum, pectins, gum arabic, gum tragacanth and resin, and is initially in a pulverulent form.

3. A fatty substance according to claim 2 wherein said fatty substance is hydrogenated palm oil having a melting point of from 38°–40° C.

4. A fatty substance according to claim 2 wherein said fatty substance is a mixture of hydrogenated palm oil having a melting point of from 38°–40° C. and hydrogenated palm oil having a melting point of from 42°–44° C.

5. A fatty substance as defined in claim 3 wherein said vegetable gum is a mixture of guaranate and carraghenate.

6. A fatty substance as defined in claim 4 wherein said vegetable gum is a mixture of guaranate and carraghenate.

7. A fatty substance according to claim 2, wherein the amount of said dry gum is between 0.02 and 0.8% by weight of said fatty substance.

8. A process for preparing a fatty substance having a quasi-vitreous structure at room temperature comprising heating a fatty substance which is of essentially crystalline structure at room temperature and contains fatty constituents which are glyceridic esters of fatty organic acids, some of said fatty constituents being solid at room temperature and some being liquid at room temperature, above the melting point of the fatty substance, adding higher polyholoside vegetable gum in amounts between 0.1 and 1.5% by weight of said fatty substance, said gum being dry and insoluble in said fatty constituents, dispersing the gum in the mass of fatty substance, allowing the mass to cool to a temperature below said melting point, and kneading the cooled mass until a firm consistency is obtained.

9. A process according to claim 8, wherein the mass is also kneaded while the mass cools.

10. A process according to claim 8 wherein some of said fatty constituents is added after the addition of said gum.

11. A process according to claim 8 wherein some of said fatty constituents is mixed with said gum when said gum is added.

12. A process according to claim 11 wherein some of said gum is added when the fatty substance has achieved a firm consistency.

13. The process of preparing a fatty material having a quasi-vitreous structure at room temperature, comprising the steps of:
(a) heating a fatty substance having a solid, essentially crystalline structure at room temperature to a temperature above its melting point, said fatty substance containing constituents which are glyceridic esters of fatty organic acids some of which are solid at room temperature and others of which are liquid at room temperature;
(b) adding higher polyholoside vegetable gum to the melted fatty substance in amount sufficient to provide a selected quantity of gum in the fatty substance which is unassociated with water, said selected quantity being between 0.01% and 1.5% by weight of the fatty substance and said gum being insoluble in said fatty substance;
(c) cooling the melted fatty substance with added gum so that its temperature is below the crystal nucleation temperature of the fatty substance; and
(d) kneading the cooled mass at least while its temperature is sufficiently below said nucleation temperature as to provide said quasi-vitreous structure.

14. The process as defined in claim 13 including the step of kneading the fatty substance with added gum while the temperature of said fatty substance is above its melting point.

15. The process as defined in claim 13 wherein the temperature of the cooled mass is maintained substantially constant during step (d).

16. The process as defined in claim 15 wherein said fatty substance is hydrogenated palm oil having a melting point of from 38°–40° C.

17. The process as defined in claim 15 wherein said fatty substance is a mixture of hydrogenated palm oil having a melting point of from 38°–40° C. and hydrogenated palm oil having a melting point of from 42°–44° C.

18. The process as defined in claim 16 wherein the temperature of the cooled mass is maintained at 27° C. during step (d).

19. The process as defined in claim 13 wherein said vegetable gum is a mixture of guaranate and carraghenate.

20. The process as defined in claim 17 wherein said vegetable gum is a mixture of guaranate and carraghenate.

21. The process of preparing a fatty substance which is of quasi-vitreous structure at room temperature, comprising the steps of:
(a) heating a mixture of glyceridic esters of fatty organic acids, which mixture is solid at room temperature, to a temperature above its melting point;
(b) adding a vegetable gum selected from the group consisting of glycosides yielding at least five glycoses on hydrolysis to the melt of step (a) in amount sufficient to provide between 0.01 to 1.5% by weight of said gum in the dry state;
(c) cooling the mixture of step (b) to a temperature below the crystal nucleation temperature of said mixture of glyceridic esters; and
(d) kneading the cooled mass of step (c) to disperse said gum therethroughout and produce a quasi-vitreous structure therein.

22. A chocolate compound characterized by its quasi-vitreous structure, consisting essentially of:
an edible fatty substance which is solid at room temperature; and
(b) a chocolate component admixed with (a);
said fatty substance consisting essentially of an edible fat having a melting point in the order of 40° C. and having a dry vegetable gum mechanically dispersed therethroughout in amount sufficient to impart a quasi-vitreous structure to the fatty substance at room temperature, and said chocolate component containing sugar, edible oils, skim milk and low butter cocoa.

* * * * *